July 2, 1929.  W. W. NUGENT  1,719,619
SIGHT FLOW INDICATOR
Filed Sept. 11, 1925
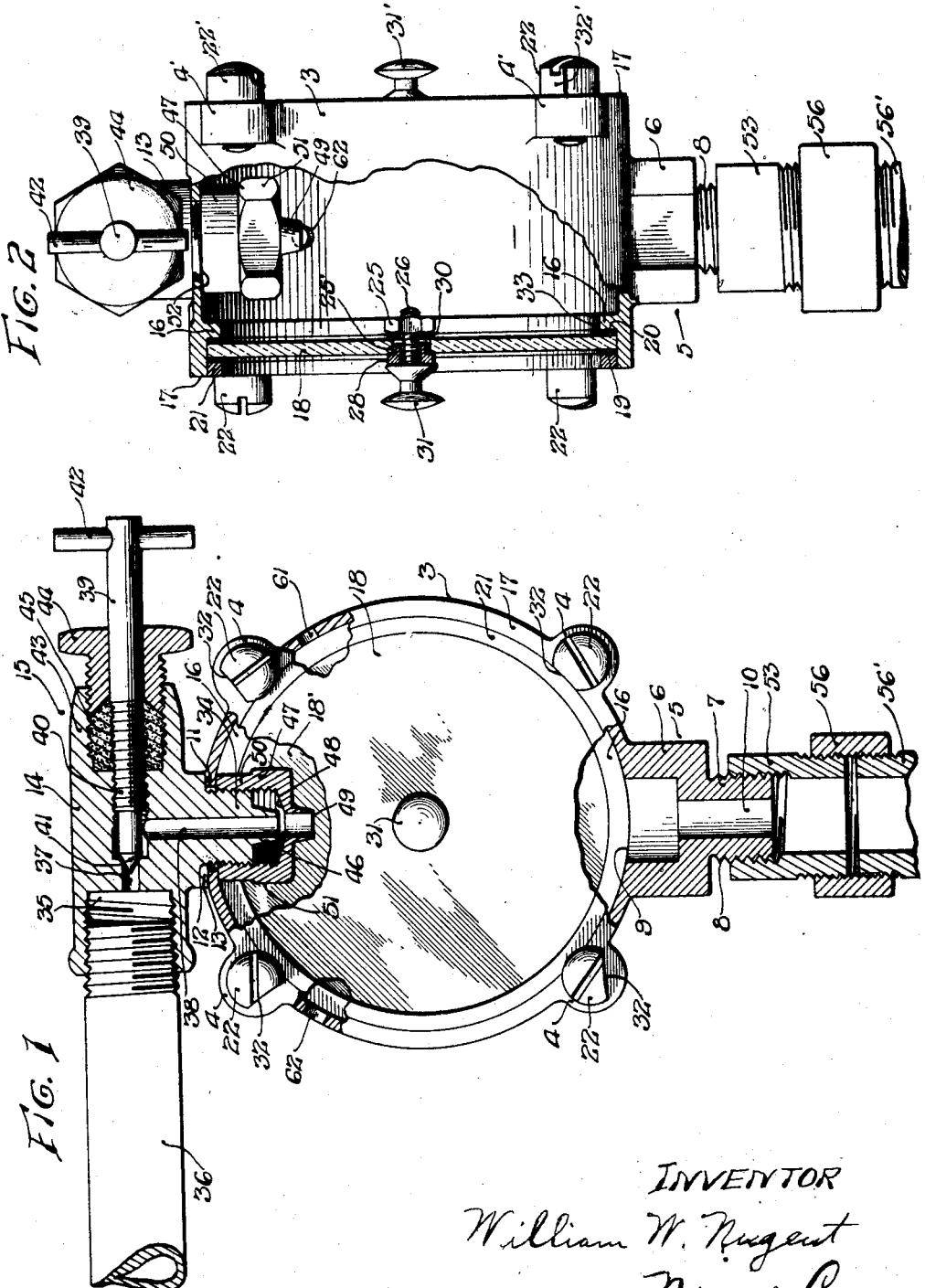
INVENTOR
William W. Nugent
By Nissen & Crane
ATTYS.

Patented July 2, 1929.

1,719,619

UNITED STATES PATENT OFFICE.

WILLIAM W. NUGENT, OF CHICAGO, ILLINOIS.

SIGHT-FLOW INDICATOR.

Application filed September 11, 1925. Serial No. 55,684.

My invention relates to sight-flow indicators adapted to be used in a lubricating system to disclose the rate of flow of lubricant therethrough, and has for one of its objects the provision of means that can be seen from a considerable distance and from various angles, from different positions in an engine-room.

Another object of my invention is the provision of simple and effective means for permitting lubricant to be viewed while being fed from a supply pipe or other source of supply, to a surface to be lubricated.

A further object of my invention is the provision of means for permitting the transparent member of the sight-feed to be easily and quickly taken out to be cleaned, and easily and quickly put back securely in place, without interfering with the flow of liquid, or taking apart the valve or its connecting piping.

A still further object of my invention is the provision of means to permit the sight-feed mechanism to be adjusted so as to be viewed from any desired location in a room without changing the position of the pipes which lead to and from the device.

Another object of my invention is the provision of means for securing the sight-feed mechanism in its adjusted position.

Other objects of the invention will appear hereinafter, the novel features and combinations being set forth in the appended claims.

In the accompanying drawings—

Fig. 1 is a front elevation, partly in section, of a sight flow indicator embodying my invention; and Fig. 2 is a side elevation, partly in section of the structure shown in Fig. 1, with portions thereof broken away to show underlying parts.

Referring to the drawings, 3 designates a cylindrical metal casing having spaced-apart bosses 4 thereon projecting radially from the periphery at both ends. A depending projection 5 integral with the cylinder 3 is so formed so as to provide a hexagonal nut 6. Depending from the nut 6 is a projection 7 provided with screw threads 8. The depending projection 5 is located at the bottom of the cylinder 3 and midway between the open ends thereof. An opening or passageway 9 at the bottom of the cylinder 3 communicates with the oil passage 10 through the nut 6 and the screw-threaded extension 7. At the center of the uppermost outer surface of the cylinder 3 is a flat annular horizontal seat 11 positioned opposite the opening 9 so as to be in vertical alinement with the oil passage 10. The circular opening 12 surrounded by the flat horizontal seat 11 is concentric with the circular opening 9. The substantially flat upper annular seat 11 is adapted to receive the annular shoulder 13 of the framework 14 of the valve mechanism 15. This valve mechanism may be similar to that shown in my United States Letters Patent No. 1,212,387, granted to me on January 16, 1917. Adjacent both ends 17 of the cylinder 3 are located the inwardly projecting annular flanges 16 to afford seats for transparent members 18. It should be understood that although Fig. 2 shows only one of the seats 16 there is another one similar to it at the other end of the cylinder 3.

The transparent member 18 preferably comprises a glass plate of circular form and of such diameter as to be freely movable into the end of the cylinder so as to rest against the seat 16. The circular glass plate 18 may be held in place by a detachable metal ring 21 which fits within the cylinder at the circular annular edge 17. Annular washers or gaskets 19 and 20 may be placed on opposite sides of the glass plate at the periphery thereof, not only to serve as a yielding support for the glass plate, but also to afford a liquid-tight joint between the periphery of the glass plate and the cylinder.

The retaining ring 21 may be held in place by a plurality of circumferentially spaced cap screws 22 which are screw-threaded into the bosses 4. The thicknesses of the gaskets 19 and 20 may be such that the outer surface of the ring 21 may project flatly beyond the edge 17 of the cylinder so that when the cap screws are turned they will act as cams to press the ring 21 firmly against the gasket 19 and thus firmly seat the glass plate against the annular seat 16.

The heads of the cap screws 22 are provided with flat or arcuate surfaces 32 which are adapted to occupy positions which are substantially tangent to the periphery of the retaining ring 21. When all of the cap screws are moved to the positions at the lower right-hand portion of Fig. 1 the washer 20, the glass plate 18, the washer 19 and the retaining ring 21 may be freely inserted into the cylinder against the annular seat 16. Then the cap screws may be turned so that the head of each will press against the retaining ring 21 and force the latter against the washer 19 which will have the effect of also compressing the gasket 20 and thereby affording a liquid-tight joint between the peripheral portion of the glass plate 18 and the cylinder 3. Both ends of the cylinder 3 are provided with similar glass plates or detachable windows so that a view of the interior of the cylinder may be had from either end by looking through the cylinder from either direction.

The cylinder 3 together with the transparent closures at its ends are mounted on the valve mechanism 15 so as to be suspended therefrom and adjustable to various positions on an upright axis. When the cylinder 3 is released at its seat 11 from the annular shoulder 13 it may be turned through wide angles to adjust the position of the sight-feed so that it may be viewed from any desired direction. The frame 14 of the valve mechanism 15 is provided with a depending threaded projection 34 which extends through the opening 12 in the top of the cylinder 3. A screw-threaded cap 47 is disposed over the end of the depending projection 34 and comprises an upper collar 50 and a hexagonal nut 51. The upper annular shoulder 52 of the collar 50 is adapted to clamp against the cylinder 3 below the edges of the opening 12 so as to co-operate with the shoulder 13 and clamp the cylinder in adjusted angular position relative to the valve mechanism 15. It can readily be seen that when the nut 51 is loosened the cylinder 3 may be turned through wide agles while supported on the shoulder 52 and when the cylinder is in its adjusted position it may be securely held there by tightening the nut 51 and locking the annular seat 11 in fixed position relative to the T-shaped frame 14.

In Fig. 1 a horizontal pipe 36 is shown connected to the frame 14 at the opening 35. Passageways 37 and 38 in the frame 14 lead to the nozzle 46 at the lower end of the depending projection 34. The nozzle 46 is in vertical alinement with the nozzle 49 at the lower end of the cap 47.

In order to control the flow of the lubricant from the horizontal pipe 36 to the nozzles 46 and 49 a needle valve 41 is provided in the frame 14, as shown in Fig. 1. This needle valve is connected to the stem 39 which is screw-threaded at 40 to the frame 14. By means of the handle 42 the valve 41 may be opened or closed. A stuffing box 43 is shown in Fig. 1 for the valve stem 39. A stuffing box nut 44 is in position to operate against the packing 45.

As explained above, it is preferred to provide both ends of the cylinder 3 with transparent closures, but it should also be understood that the cylinder should be of sufficient size to permit the flow or dropping of the lubricant to be viewed from a considerable distance. The provision of transparent closures at both ends of the cylinder and making the cylinder large in size will permit sufficient illumination of the oil flow to enable the attendant to view it at a considerable distance from the indicator, and by reason of the angular adjustment provided such attendant may be provided with an unobstructed view from any desired direction. Such angular adjustment may be both for the convenience of the attendant and to permit most efficient illumination of the oil flow through the indicator.

Inasmuch as it is desirable to have the transparent closures liquid-tight an opening in the cylinder should be provided for inflow of air so as to prevent an air pocket within the indicator by reason of the flow of oil therethrough. It is preferred to locate such an opening in the upper cylindrical portion of the cylinder 3, such as that indicated at 61. In addition to preventing an air pocket in the indicator which would interfere with the desired flow of the oil from the nozzle 49 it is preferred to provide ventilation within the indicator and this may be done by providing an additional opening in the cylinder 3, as indicated at 62. By providing ventilation within the indicator the temperature of the air within the indicator is kept substantially the same as the atmosphere surrounding the indicator and therefore the collection of moisture on the inner sides of the glass plates will be prevented. It is desirable to keep the glass windows 18 perfectly transparent by avoiding the collection of such moisture, so that the dropping or flowing of the oil through the indicator will be kept visible from considerable distances at all times.

It should be particularly noted that the shoulder 13 of the frame 14 of the valve mechanism 15 is at a fixed elevation and therefore the turning of the indicator to various angular positions will not change the elevation of the indicator itself. In other words, the indicator may be adjusted to various angular positions without altering its elevation, because after the nut 51 is turned to clamp the shoulder 52 against the cylinder 3 at the opening 12 the pipe of the indicator remains the same as before. However, in some instances it may be desirable to provide for compensation of the tendency to lift or lower the lower pipe 56' by reason of the turning of the depending screw-threaded projection 7. For this purpose a pipe connection 53 and a nipple 56 may be connected between the depending screw-threaded projection 7 and the vertical pipe 56'. For instance, if the turning of the indicator on its vertical axis tends to lift the pipe 56' the coupling 53 may be turned in such direction to compensate for such lifting tendency, and when the turning of the indicator tends to lower the pipe 56' the pipe coupling 53 may be turned in the opposite direction to compensate for such tendency. By this arrangement the supply pipe 36 and the discharge pipe 56' may occupy fixed positions and nevertheless the indicator may be adjusted to various angular positions on the upright axis which is concentric with the passages 38 and 10.

After the indicator has been adjusted to the desired angular position and secured in adjusted position by tightening the nut 51 the glass windows 18 are both secured in closed positions, as indicated in the drawings. The nut 51 will then be entirely closed by the indicator and therefore maintenance of the angular position to which the indicator has been adjusted is assured. In order to obtain access to the nut 51 to loosen it so that the indicator may be readjusted, the heads of the cap screws 22 must be turned until their flat faces 32 are tangent with the peripheral edges of the glass windows 18, whereupon the retaining ring 21 may be released. In order to facilitate removal of the glass plates 18 they are provided with handles 31 and 31' at their centers. Such handles afford an equalized pulling means for pulling all portions of the periphery of the glass plate at the same time along the interior surface of the cylinder and thus prevent binding of the glass plate within the cylinder while attempting removal therefrom. Furthermore, the glass plate may be inserted a sufficient distance into the cylinder to permit the use of the retaining ring 21, and when the glass plate is to be removed no instruments of any kind need be used at the peripheral edges of the glass plate which would be likely to break the glass or chip it. Moreover, the provision of the handles at the centers of the glass plates affords a means of removing them without necessitating the attendant's fingers coming in contact with the glass plates and covering them with greasy finger prints.

The handle 31 is provided with a screw-threaded stem 26 which is of sufficient length to extend through an opening 25' in the glass plate 18 to the space within the cylinder 3. The stem 26 is adapted to receive a nut 25. Fibrous washers 28 and 30 may be provided, as shown in Fig. 2. The washer 28 is in the form of a bushing and the washer 30 may be a ring. These washers not only protect the glass from being cracked or broken when the nut 25 is tightened to secure the handle to the glass, but also afford a liquid-tight closure for the hole 25' at the center of the glass plate. The liquid-tight closures at the centers of the glass plate, together with the liquid-tight closures at the peripheral portions of the glass plates prevents the indicator from leaking oil or lubricant if the flow from the nozzle 49 to the pipe 56' becomes so great as to cause backing up of the oil or lubricant in the indicator from the pipe 56'. If such excess flow of oil should occur it will at once be observable to the attendant who may close the valve 41 until the excess oil has flowed through the pipe 56'. Then by means of the central handles 31 and 31' the glass plates may be removed after the retaining rings 21 have been released by partial turnings of the heads of the cap screws 22, as above explained. After cleaning the surfaces of the glass plates where the lubricant has come in contact with them they may be replaced and each locked in their closed positions.

When the oil flow through the indicator is taking place under normal conditions but the ventilation within the indicator is not sufficient, notwithstanding the vents 61 and 62, further ventilation may be afforded by removing one of the handles 31 or 31' so that there will be a communication through the hole 25', at the center of the glass plate 18 from the interior of the cylinder to the atmosphere surrounding the interior While the provision of detaching one of the windows or glass plates 18 is sufficient for cleaning access to the interior of the cylinder to operate the nut and for cleaning purposes, it is preferable to provide both windows with detaching means so that access may be readily gained to the interior of the indicator irrespective of its angular adjustment and without changing its angular adjustment. When access is gained to the interior of the structure the nut 51 is operated by a hand wrench and when the proper adjustment is secured it is tightened securely in place and by having both windows detachable no care need be exercised as to which side of the indicator is turned toward the observer or is located on that side of the machinery where the window would be most accessive.

Obviously those skilled in the art may make various changes in the details and arrangement of parts without departing from the spirit and scope of the invention defined by the claims hereto appended and it is therefore desired not to be restricted to the precise construction herein disclosed.

In some instances one or both of the end closures may be entirely omitted, but it is preferred to use both of them, as shown in the drawings, where the flow of oil is to be protected against air currents and foreign material, such as dust floating in the air. It is also advantageous to have both end closures and mount them in the casing so as to be liquid-tight to contain oil when the same backs up from the pipe 56' or collects in the lower portion of the casing due to some abnormal condition preventing free flow through the pipe 56'. The sight-feed lubricator shown in the drawings is particularly adapted to automatic circulating lubricating systems for large engines, but may have a general application.

Having thus fully described and shown an embodiment of the invention, what is desired to be secured by United States Letters Patent is:

1. In lubricating apparatus, the combination with a sight-feed indicator, of a stationary support below said indicator, means at the upper side of said indicator for permitting angular adjustment and securing the same in adjusted position without changing the elevation of the indicator, and an extensible connection between said support and the lower side of said indicator for compensating for the tendency to change the elevation of the indicator when the latter is adjusted in its angular position.

2. In a sight-feed indicator for lubricating apparatus, the combination with a cylindrical casing, of means for mounting said casing at its top and bottom for angular adjustment on an upright axis, mechanism for directing lubricant into said casing, and means located at the top and inside of said casing for securing the latter in adjusted angular position.

3. In a sight-feed indicator for lubricating apparatus, the combination with a casing, of means comprising a nut within said casing for mounting the latter for angular adjustment on an upright axis, and mechanism for directing lubricant into said casing.

4. A sight-feed indicator for lubricating apparatus comprising a casing, means comprising a nut within said casing at the upper portion thereof for mounting the casing for angular adjustment on an upright axis, and means for directing lubricant through said nut into said casing.

5. A sight-feed indicator for lubricating apparatus comprising a casing having an opening in its top adapted to receive a lubricant inlet, means within the casing for clamping the lubricant inlet to said casing, and means for directing lubricant from said inlet through said casing.

6. A sight-feed indicator for lubricating apparatus comprising a frame having an opening in its top, a screw-threaded hub projecting through said opening, a nut on said screw-threaded hub, means co-acting with said nut and said hub for clamping the latter to said frame, and means comprising a nozzle connected to said nut for directing lubricant through said frame.

7. A sight-feed indicator for lubricating apparatus comprising an open-ended casing, a mounting for supporting said casing for angular adjustment on an upright axis, and mechanism comprising a nut on the inside top portion of said casing for securing the latter in its adjusted angular position.

8. In a sight-feed indicator for lubricating apparatus, the combination with an open-ended cylinder having a circular opening in its top with annular seats on the top of said cylinder and inside thereof, of a hub provided with a shoulder adapted to rest against the outside seat, said hub being screw-threaded and projecting through the opening in the top of said cylinder, a nut threaded on said hub and provided with a shoulder adapted to engage the lower seat inside of said cylinder, and oil inlet nozzles on said hub and on said nut for directing lubricant into said open-ended cylinder.

9. In lubricating apparatus, the combination with valve mechanism for controlling the flow of a lubricant, of a sight-feed casing rotatably mounted on said valve mechanism, and means operated from within said flow indicating means for securing the latter in fixed angular position relative to said valve mechanism.

10. In a sight feed indicator for lubricating apparatus, a casing having a transparent member, spaced stationary supports for the casing, and means mounting the casing to the supports for angularly adjusting said transparent member without changing the elevation of the casing.

11. In lubricating apparatus, the combination with a sight-feed indicator comprising a cylindrical casing having an opening in the upper side thereof, of valve mechanism for controlling the flow of liquid to said indicator, a threaded extension projecting through said opening in the upper side of said casing and provided with a liquid passageway leading into said casing, and a cap screw on the inside of said casing threaded on said extension to clamp the valve mechanism to said casing and secure the latter in adjusted angular position relative to said valve mechanism, said cap screw being provided with a passageway for receiving liquid from said first-named passageway and directing it into said casing.

12. In lubricating apparatus, the combination with valve mechanism, of a sight-feed indicator connected to said valve mechanism comprising a casing having a sight glass, said casing being mounted for angular adjustment relatively of said valve mechanism, and means operable from within said indicator for clamping the latter to said valve mechanism in fixed angular position relative thereto.

13. In lubricating apparatus, the combination with a supply pipe, of valve mechanism for controlling the flow of lubricant from said supply pipe, a feed indicator connected directly to said valve mechanism, an outlet pipe, and detachable connections between said feed indicator and said supply pipe and said outlet pipe for permitting angular adjustment of the feed indicator in the holding thereof in adjusted position relative to said supply pipe and said outlet pipe.

14. In lubricating apparatus, the combination with a sight-feed indicator, of valve mechanism for controlling the flow of lubricant from an upper supply pipe into the top of said indicator, means for connecting the indicator to said valve mechanism for angular adjustment relative thereto on an upright axis, a stationary support for the indicator comprising an outlet pipe, and an extensible connection between the bottom of the indicator and said outlet pipe adapted to compensate for the change in elevation caused by the angular adjustment of the indicator.

15. A sight-feed indicator comprising a casing having a side opening therein, a transparent closure for said side opening, means for detachably holding said transparent closure in said opening, mechanism for mounting said indicator for angular adjustment on an upright axis, a nut within the casing for holding the same in fixed angular position, and a handle for said closure to facilitate removal thereof without touching the same and afford access to said nut when the indicator is to be adjusted in angular position.

16. A sight flow indicator for lubricating apparatus comprising a casing, a movable transparent closure for a side opening in said casing, clamping devices for detachably holding said closure in place at the side opening, and a handle at the center of said transparent closure to facilitate removal thereof without touching the same.

17. A sight-feed indicator comprising a casing, a transparent closure for a sight opening in said casing, and a handle detachably connected through an opening in said transparent closure to permit such opening to be used for ventilation when said handle is removed.

18. A sight feed indicator comprising a casing, transparent closures for opposite ends of said casing, handles detachably secured in openings in said transparent closures to enable the same to be removed and replaced without finger-marking the surfaces of said closures, and means for detachably holding said transparent closures in the opposite ends of said casing.

19. A sight feed indicator comprising a cylindrical casing having open ends, annular seats, glass discs fitting in said annular seats, means for detachably holding said glass discs in said open ends of said cylindrical casing, and handles secured to said glass discs at openings therein to facilitate removal of such glass discs and the replacement thereof without finger-marking the surfaces of said glass discs.

20. A sight feed indicator comprising a casing, a transparent closure for a sight opening in said casing, means for detachably mounting said transparent closure in said opening, and a handle detachably secured to said transparent closure at an opening therein to facilitate removal of said transparent closure from said casing.

In testimony whereof I have signed my name to this specification on this 8th day of September A. D. 1925.

WILLIAM W. NUGENT.